United States Patent [19]

Ledet et al.

[11] Patent Number: 5,410,951
[45] Date of Patent: May 2, 1995

[54] APPARATUS AND METHOD FOR CONTINUOUS HIGH-VOLUME STEAM COOKING

[75] Inventors: Brent A. Ledet; David A. Johnson, both of Metairie, La.

[73] Assignee: The Laitram Corporation, Harahan, La.

[21] Appl. No.: 145,813

[22] Filed: Nov. 2, 1993

Related U.S. Application Data

[63] Continuation-in-part of Ser. No. 14,713, Feb. 8, 1993, which is a continuation-in-part of Ser. No. 887,832, May 26, 1992, Pat. No. 5,184,538.

[51] Int. Cl.$^6$ .................. A23L 3/00; A23N 12/00; A47J 27/16
[52] U.S. Cl. .................. 99/443 C; 99/468; 99/477; 99/483; 99/516
[58] Field of Search .................. 99/443 C, 473, 474, 99/475, 477, 478, 483, 516; 198/853, 494, 834

[56] References Cited

U.S. PATENT DOCUMENTS

| | | | |
|---|---|---|---|
| 1,992,398 | 2/1935 | Ryder | 146/47 |
| 3,491,679 | 1/1970 | Kelly | 99/331 |
| 3,718,082 | 2/1973 | Lipoma | 99/470 |
| 3,908,533 | 9/1975 | Fagerstrom et al. | 99/386 |
| 3,910,175 | 10/1975 | Smith | 99/443 C |
| 4,171,045 | 10/1979 | Lapeyre | 198/853 |
| 4,862,794 | 9/1989 | Lapeyre et al. | 99/443 |
| 4,887,524 | 12/1989 | Ellis-Brown | 99/443 |
| 4,925,013 | 5/1990 | Lapeyre | 198/853 |
| 4,925,016 | 5/1990 | Lapere | 198/853 |
| 4,937,090 | 6/1990 | Bichel | 426/509 |
| 4,942,810 | 7/1990 | Zittel et al. | 99/477 |
| 5,072,663 | 12/1991 | Ellis-Brown | 99/331 |
| 5,156,873 | 10/1992 | Skrmetta | 426/510 |
| 5,184,538 | 2/1993 | Ledet | 99/331 |

FOREIGN PATENT DOCUMENTS

2005524 4/1979 United Kingdom .

OTHER PUBLICATIONS

"Garroutte Pure Steam Blanching Systems" Brochure, Garroutte Corp.

Primary Examiner—Timothy F. Simone
Assistant Examiner—Reginald L. Alexander
Attorney, Agent, or Firm—James T. Cronvich

[57] ABSTRACT

An improved apparatus and method for uniformly cooking thick layers of food product in a saturated steam environment. A foraminous conveyor belt transports a thick layer of food product into a walled cooking chamber open at its ends. The walls trap pure saturated steam to the exclusion of air in the upper region of the chamber. A pressurized source of cooking energy supplies steam through a network of steam pipes situated just below the level of the belt along its carryway through the upper region of the cooking chamber. The pipes, which span the width of the conveyor belt, include small, restricted openings uniformly distributed along the pipes. The openings form steam outlets. The pipes are oriented with the steam outlets facing the conveyor belt. Saturated steam is emitted through the outlets directed through the foraminous conveyor belt at a velocity great enough to penetrate the thick product layer to cook even the innermost product within the thick layer, thereby improving the uniformity of the cook. The thick product layer slows the steam as it penetrates the layer to prevent the formation of turbulent flow paths that could draw unwanted air into the 212° F. saturated steam cooking region. An S-shaped back-flip in the conveying path repositions the product on the belt to further improve cooking uniformity.

14 Claims, 8 Drawing Sheets

APPARATUS AND METHOD FOR CONTINUOUS HIGH-VOLUME STEAM COOKING

This application is a continuation-in-part of application Ser. No. 08/014,713, filed Feb. 8, 1993, for SELF-SEALING ACCESS DOOR FOR STEAM COOKERS, which is a continuation-in-part of application Ser. No. 07/887,832, filed May 26, 1992, for HIGH EFFICIENCY STEAMCOOKER, now U.S. Pat. No. 5,184,538, issued Feb. 9, 1993.

BACKGROUND

This invention relates to steam cooking of food products and, more particularly, to industrial high-volume cookers continuously conveying food products, such as thick layers of vegetables, through a cooking chamber on a flighted foraminous conveyor belt through which jets of steam are directed.

Steam cookers through which conveyor belts carry food products are well known. For example, skins are loosened on tomatoes carried on a conveyor belt in Ryder, U.S. Pat. No. 1,992,398, Feb. 26, 1935 by maintaining a cooking zone of superheated steam at above atmospheric pressure. There is no attempt to efficiently cook the entire product, nor to produce an efficient cooker. Thus, the hot steam at high pressure is used to purge air out of the cooking zone and thus the steam energy is inefficiently used for cooking the food.

Vegetables are steam cooked by vaporized water over a body of boiling water in Bichel, U.S. Pat. No. 4,937,090, Jun. 26, 1990. The lower cooking temperatures, criticality in temperature and product controls, and inefficiency of heat exchange between the product and heating medium encompass a long cooking time and prevents uniformity and efficiency of cooking from the energy source that heats the water tank.

Ellis-Brown, U.S. Pat. No. 5,072,663, Dec. 17, 1991, specially teaches a cooker for shrimp with steam flowing at a pressure higher than atmospheric through a cooking zone containing a conveyor belt. Input cooking steam is mixed with air carried into the compartment by the belt, and vapors released by the cooking shrimp before reaching the shrimp cooking region, so that the input steam energy is not concentrated and spent solely upon the shrimp being cooked. Furthermore, uniform cooking conditions are difficult to obtain because of dependency upon variable air temperature and humidity, for example. Also, hotter steam migrating to the top of the compartment is discharged out of the top of the cooker to further decrease cooking efficiency. The incoming steam pressure keeps the compartment above atmospheric pressure, thus further tending to force the hot steam out into the atmosphere. Since an attempt is made to conserve minor energy losses through cabinet walls with specially formed insulation of stainless steel housing, it is clear that a more efficient system was not recognized.

A previous development is a saturated steam cooker in the George C. Lapeyre et al. U.S. Pat. No. 4,862,794, Sep. 5, 1989, for APPARATUS FOR CONTROLLING PRECOOKING AND MACHINE PEELING SHRIMP. This cooker carries shrimp on a conveyor into a shallow inverted open bottom box into which is continuously fed saturated steam near the closed top panel where it remains until condensation descends into the atmosphere through the open bottom as it cools from the cooking of shrimp on the conveyor belt by saturated steam at the constant temperature of 212° F. Thus, as long as the saturated steam is replenished as needed to replace cooking energy for the amount of shrimp cooked in its presence, the cooking temperature remains constant. There is a significant advantage in keeping air and vapors from the saturated steam by the flow of fresh saturated steam into the cooking region. In addition to decreasing cooking efficiency, air and vapors carry oxygen, which reacts with the cooking product, whether shrimp or vegetables, to degrade the quality and appearance (i.e., taste and color) of the cooked product.

This prior art cooker works well, but has been found to have operational deficiencies which are resolved by the present improved cooker. For example, the shallow open bottom box structure permits the escape of enough hot steam to reduce cooking efficiency. Also, a shallow open bottom container for confining saturated steam permits entry of contaminants such as air or internal vapors in response to external and internal air flow paths. For example, if in the vicinity of cross winds from an open window or heater duct in a plant, the retention of uncontaminated saturated steam in the cooking region necessary for cooking efficiency and repeatable cooking quality control is not feasible.

Furthermore, the cooking of various sizes of shrimp at differing input temperatures and moisture content, etc., when carrying various loading densities of raw shrimp in industrial quantities on a movable conveyor belt through the cooker imposes a wide range of cooking conditions. The prior art cookers could not handle efficiently such wide ranges of conditions encountered in practice with efficient cooking methods at high volume industrial capacity where cooking speeds must be high without deterioration of consistent product quality under simple and effective automatic control conditions. For example, the shallow height of the cooking chamber in the Lapeyre et al. cooker makes it difficult to maintain control under varying thermal product loads.

Thus this invention has as an objective the improvement of the state of the art by providing an improved automatically controlled cooking chamber with internal pressure substantially atmospheric that prevents dilution or variation of the 212° F. cooking energy of saturated steam surrounding the product being cooked.

Further, it is a general objective of the present invention to provide more efficient and uniform cooking methods and equipment adapted to higher volume, higher speed industrial use.

The aforementioned objectives are met by the high efficiency steam cooker first described and claimed in related U.S. Pat. No. 5,184,538 to Ledet. Nevertheless, the high-volume cooking or blanching of thick or dense layers, or mats, of vegetables presents a problem for conventional steam cookers. In particular, it is difficult to cook uniformly a thick mat of vegetables conveyed through a steam cooking chamber in a high-volume industrial application, while simultaneously maintaining an oxygen-free saturated steam cooking environment.

Thus, yet another objective of the invention is to provide means for uniformly cooking food products conveyed in a thick mat into a steam cooking chamber.

SUMMARY

Improvements in the control and efficiency of cooking in industrial cookers carrying products through a steam cooking chamber on a conveyor belt are afforded by this invention. To obtain significantly improved efficiency from a saturated steam energy source for cooking food products, such as chicken strips, shellfish, or, particularly, thick mats of vegetables, such as peas or corn, a substantially enclosed cooking chamber having an internal pressure substantially atmospheric employs saturated steam at substantially 212° F. into which the products to be cooked are immersed. Provisions are made for constant temperature cooking with good cooking energy transfer efficiency from pure saturated steam, and for simple effective controls to replenish fresh saturated steam at a rate proportional to the cooking energy expended in the product, whereby an oxygen-free cooking atmosphere is provided. (Hereinafter, all references to cooking temperatures of 212° F. imply an ambient condition of standard atmospheric pressure. For other ambient pressures, the cooking temperature is the corresponding boiling temperature of water.)

A cooking region is provided for confining by gravity saturated steam that is injected in high-velocity jets through the product-laden foraminous belt and rises and remains in the upper zone of a closed compartment member. The saturated steam is introduced into the cooking region from a network of steam pipes having a plurality of small, upwardly-oriented orifices just below the underside of the belt along the carryway. The steam is thereby directed into the food product at a high velocity through openings perforating the conveyor belt. The directed high-velocity flow of steam penetrates the mat of product, thereby improving the transfer of heat to product in the interior of the mat. The average release of steam is at a predetermined rate to replace condensed steam and permit that condensate to drop out of the cooking region. The saturated steam flow rate is controlled to maintain a constant temperature of less than 212° F. at a position in a lower zone of the cooking region typically being between about 190° and 200° F., to thus automate simply the cooking process for high cooking efficiency from the input steam, which thus is more efficient than conventional prior art systems that permit input steam to be mixed with air and vapors throughout the cooking region.

The food products are cooked by introducing them into the constant 212° F. cooking region for a predetermined time, established by the speed of the conveyor belt through the cooking region. A plastic conveyor belt conserves loss of steam energy usually expended in heating a metal belt. The constant cooking temperature keeps automated controls simple and effective in reproducing cooking conditions for uniform quality control. By controlling the flow of steam, vapor, and air within the cooking chamber to prevent dilution of saturated steam in the cooking region, variations of temperature, cooked food quality, and uniformity and cooking inefficiencies are eliminated, as well as the danger of oxidation from air contamination. Energy losses from discharge of hotter steam are eliminated, and efficiencies are improved by the efficient heat transfer interface between saturated steam and the product to the exclusion of insulating air or vapors which absorb and waste heat energy.

In particular it is recognized that a cooking region of considerable height is required for maintaining in the cooking region substantially static flow conditions restricted to the downward movement by gravity condensate formed by the transfer of heat energy into the product and the corresponding replenishment of condensed steam with fresh saturated steam. Thus, although a circulating flow of steam within the cooking chamber caused by the high-velocity injection of steam into the product is desirable, flow paths from extraneous air or vapors must be eliminated to maintain quality and efficiency. Protective sidewalls adjacent the cooking region define a deep chamber providing a greater thermal capacity of saturated steam in the upper zone of the chamber, thereby simplifying thermal control. Substantially closed outer chamber walls insure elimination of substantially all contaminating air and vapors from the upper zone.

Uniform cooking of thickly matted products is further addressed by a product-repositioning feature in the cooking chamber. The conveyor belt is directed around an upper, forward sprocket and a lower, rearward roller to form an S-shaped, back-flip portion in the conveying path. The lower, rearward roller has a truncated star shape to accommodate flights projecting from the conveying surface of the belt. Product entering the top of the S drops to the bottom of the S, so that the product is repositioned on the conveyor for further cooking in the chamber. Thus, repositioning the product enhances the uniformity of the cooking.

Further objects, features and advantages of the invention will be found throughout the following description, drawings and appended claims.

DRAWINGS

In the accompanying drawings, wherein like reference characters refer to similar features throughout the several views to facilitate comparison:

DESCRIPTION

Figure 1:
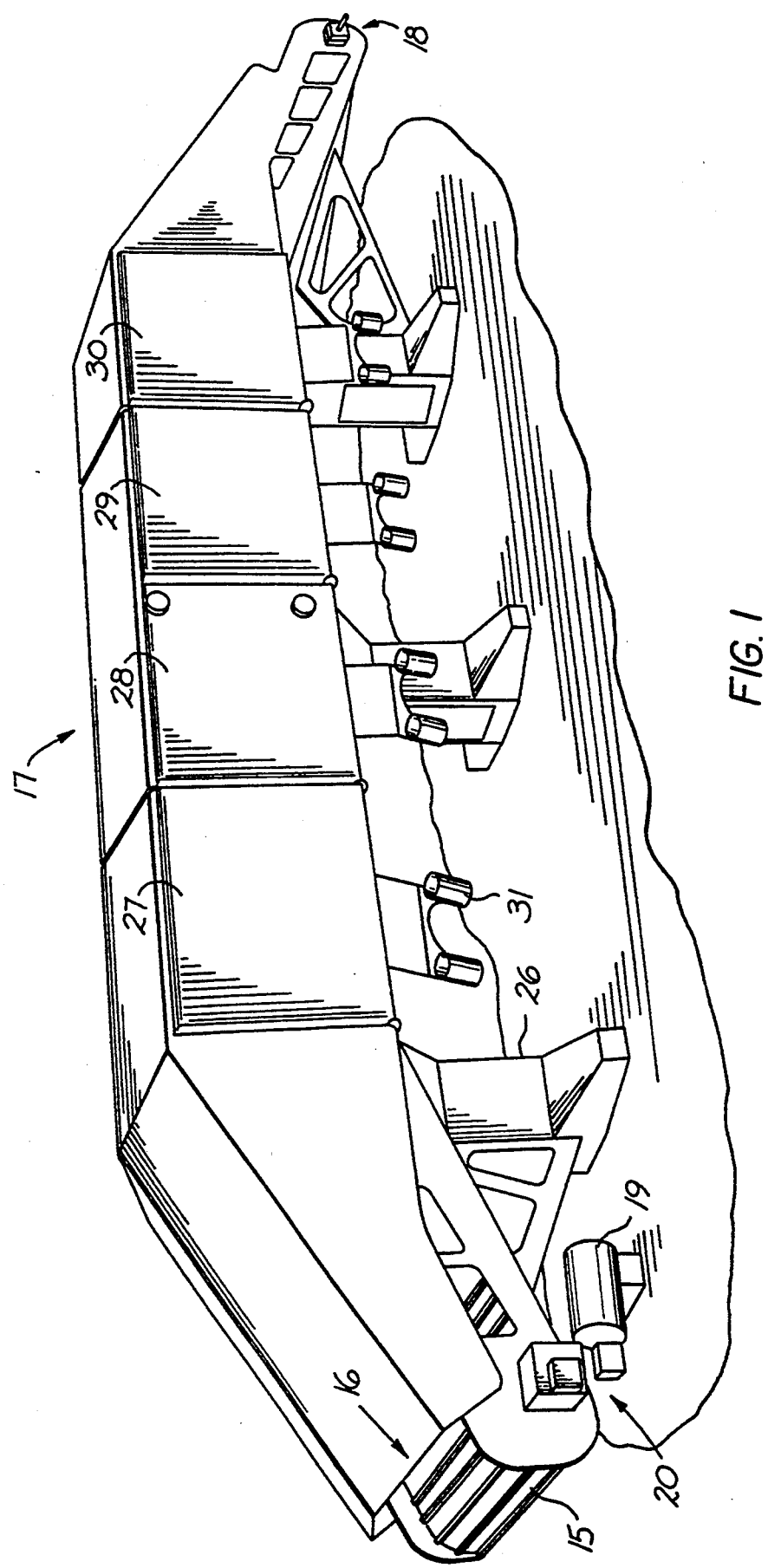
FIG. 1 is a perspective view of a steam cooker embodiment of the invention with a conveyor belt for transporting a product to be cooked, such as shrimp, through the cooker at a controlled belt speed.

Now with reference to the accompanying drawing, the features and operation characteristics of the invention will be described in more detail. As seen from FIG. 1, a product to be cooked, such as peas, is loaded on a conveyor belt 15 at the entrance port 16 for conveyance through the cooker cabinet 17 toward the output port 18. Rows of flights 21 extending laterally across the conveyor belt 15 prevent product from rolling down the belt on inclined pathways. Preferably the endless conveyor belt 15 is plastic for reducing heat losses from the cooker through radiation from a heated metal belt. A belt drive motor 19 and belt speed control system 20 are provided for varying the dwell time of the product on the belt in the cooker, as a cooking control feature. Thus, as required for cooking different products or handling different product loading densities on the belt, a desired cooking time can be established. Support legs 26 are provided with leveling adjustments. Doors 27 to 30 are moved downwardly against brackets 31 for easy access to the inside of the cooker.

Figure 2:
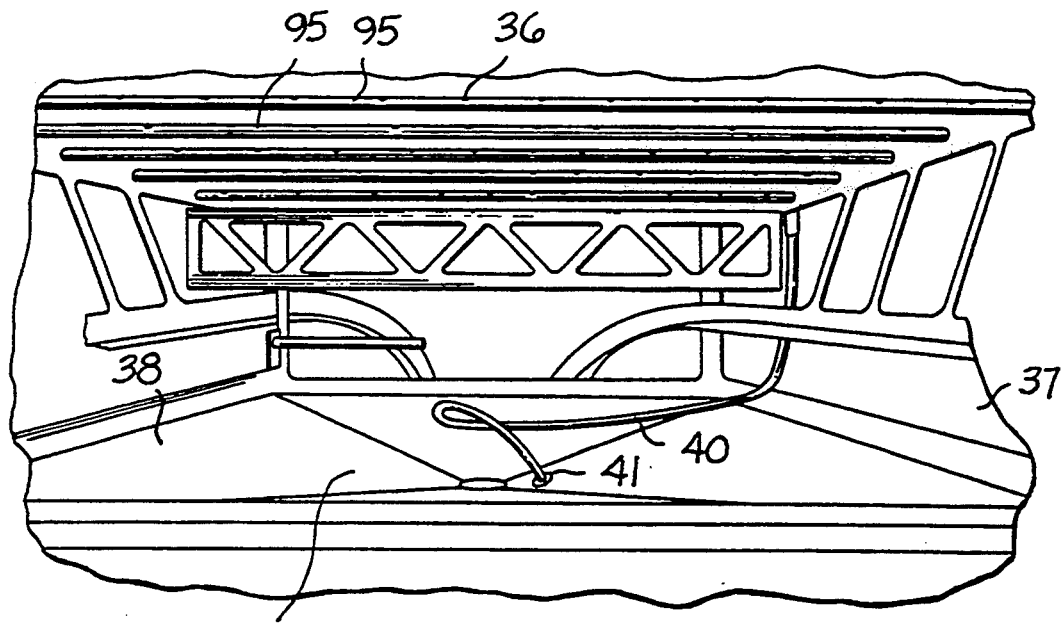
FIG. 2 is a cutaway view, without the conveyor belt in place, looking into the interior of the cooker cooking region toward the conveyor belt entrance port, showing a set of steam inlet pipes and ports, and a lower panel with condensation outlet port.

A lower part of the internal cooking region is seen in FIG. 2 looking toward the belt inlet port 16 without the conveyor belt in place. Disposed in the upper cooking zone is an interconnected manifold or set of steam inlet pipes 95 dispersed along the heating chamber for introducing saturated steam at 212° F. The multiple outlet holes or slits 36 in steam pipes 95 are directed upwardly into the product through openings, or perforations, in the foraminous belt (not shown in FIG. 1), which rides just above the steam inlet manifold pipes 95. It is important to realize in connection with this invention that the saturated steam is about half the density of air, and that the cooking region is maintained at nearly atmospheric pressure, so that the saturated steam rises in the cooking chamber to its upper limit defined by the top panel structure of the cooker 17, thus surrounding the products to be cooked on the belt.

As later set forth in more detail, the saturated steam is introduced at a rate that ensures a saturated steam atmosphere surrounding the belt in the upper zone of the cooking region. As the steam cooking energy is exchanged with the products being cooked, the steam changes phase to liquid condensate (mist and droplets) and drops by gravity to the bottom of the cooking chamber. The belt return path is through the cooking chamber to ensure that heat losses from radiation to a cooler environment are reduced, thus contributing to greater cooking efficiency provided by the cooker system of this invention.

Precaution is taken that external flow of air or vapor is kept out of the cooking region by the sidewalls 37 and bottom closure plate 38, thereby to retain a substantially static layer of saturated steam in the cooking region. The saturated steam layer extends downward from the top of the chamber to at least the level of the product on the belt. Below the steam layer is a layer comprising condensate cooler than the saturated steam. Condensate dripped from the product is accumulated by the funnel-like contour of the bottom plate 38 and funneled into the condensate discharge line 39. Steam inlet line 40 is introduced through an opening 41 in the bottom plate 38. The critical depth of the sidewalls 37 minimizes the loss of saturated steam through the belt outlet port 16 and outlet port 16'. The inlet steam rate thus is to be controlled in the manner later discussed to substantially equally replace the condensed saturated steam.

Figure 3:
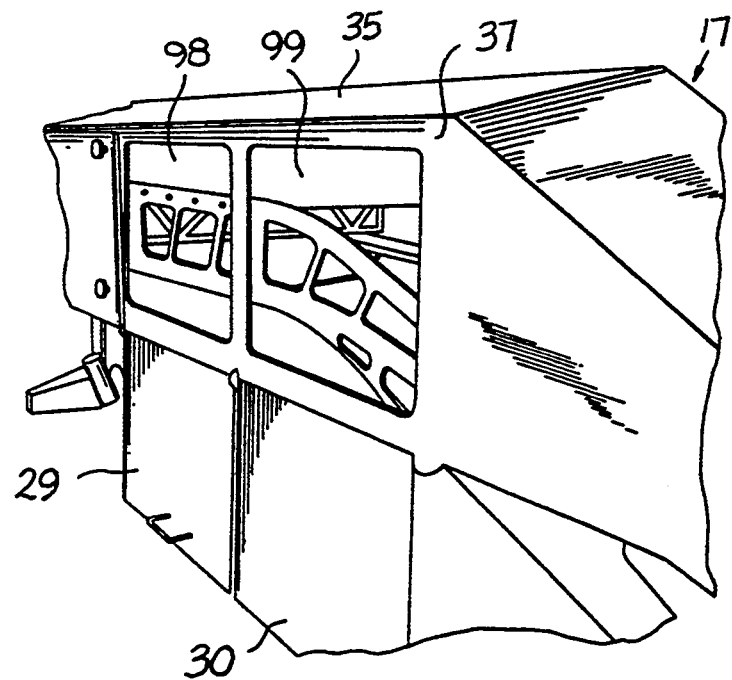
FIG. 3 is a perspective fragmental view showing the interior cooking region and conveyor belt support framework with open side access doors.
Figure 4:
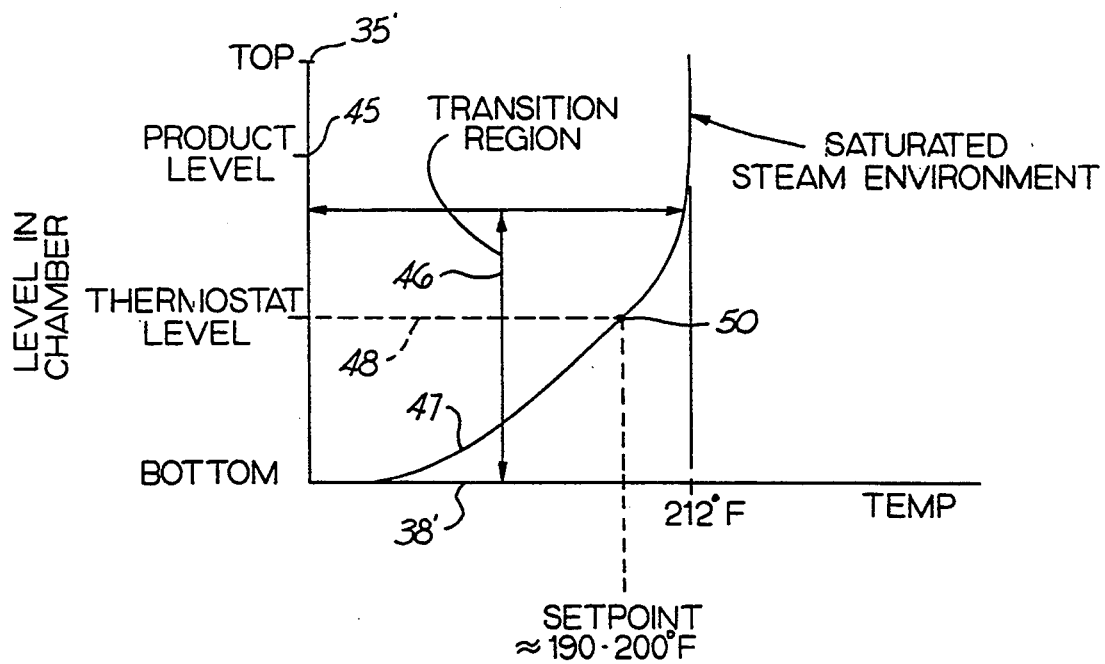
FIG. 4 is a graphical chart illustrating the saturated steam behavior in the cooking region, which contributes to efficient cooking and simple regulation of cooking conditions for repeatable quality control with various product characteristics and loading conditions.

In FIG. 3, the access doors 29, 30 are moved downwardly to show the interior cooking chamber with the belt removed. The upper panels 35 enclose the cooking region to confine the saturated steam and limit its upward flow to the chamber, as inferred at the top 35' of the graph of FIG. 4. This graph defines a product level 45, a transition region 46, comprising a mixture of cooler and heavier air and condensed water vapor, as seen from the temperature graph line 47, and a thermostat sensor level 48, as well as the bottom enclosure level 38'. Above the transition region in the upper zone of the cooking region, the saturated steam is at its 212° F. temperature, and the product is in essence immersed into the saturated steam for cooking at product level 45 to be fully surrounded by saturated steam free of insulating air, thereby ensuring efficient transfer of the steam energy to the product for fast, efficient cooking.

Because the cooking temperature is always at a constant 212° F., regulating cooking time in the cooking region ensures a consistent quality of output cooked product. Thus, simply controlling belt speed will control the product dwell time and the amount of cooking of the product.

Also the steam input control of this system is simple, because of the critical deep compartment relationship between the protected upper and lower zones of the cooking region that maintain the stratification of the pure saturated steam in the upper zone and the lower temperature condensate in the lower zone. Thus, a thermostat sensor 50 positioned at a predetermined height in a stable region of the lower temperature zone operates a proportional release of only enough fresh saturated steam to keep the temperature at the sensor, typically 190°–200° F., constant. This ensures maintenance of the 212° F. cooking temperature in the upper region and fast reliable variable adjustment of steam input to fit the needs and conditions of operation. For example, if there is a gap in the product on the conveyor belt, the system runs effectively with very little new steam but is ready immediately to operate at full load when the product appears and condenses the saturated steam in the upper zone to tend to lower the temperature at the sensor by the rising of the bottom level of the pure saturated steam layer. Adjustments are made in both directions automatically with very simple controls to keep the system running at top efficiency. For example, a commercially available self-operating variable proportional steam valve with sensor is available from H.O. Trerice Co. in Detroit, Mich. for various pipe sizes under the "Trerice Series No. 91000" brand of temperature regulators.

Figure 5:
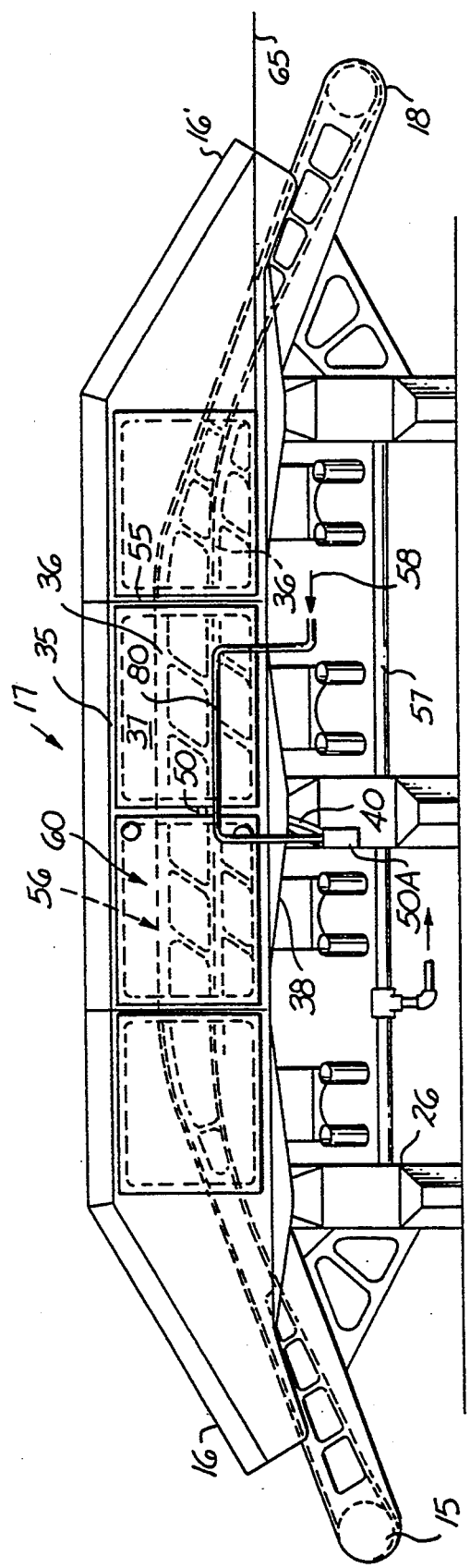
FIG. 5 is a side view sketch of a cooking conveyor embodiment of the invention showing modular construction and control system features.

The foregoing relationship is also configured in FIG. 5 with the conveyor-cooker 17 and conveyor belt 15 support system shown in side view phantom with access doors open. Note that a cooker module 55 is inserted between input port section 16 and output port section 18 of the conveyor 15 transport arrangement, as seen behind the two open doors disposed along a flat length 56 of the conveyor support bracing. Thus the closed bottom pan 38 leads into condensate drainage conduit 57 and passes steam line 40 which receives steam from a high pressure steam conduit 80 routed through the bottom pan 38 to an unshown source at lead 58 and supplying steam to the control valve 50A through the bottom pan 38. Enclosing the high pressure steam conduit within the cooking chamber increases the efficiency of the cooker and eliminates the need for insulating the conduit within the chamber. A thermostatic sensor 50 is positioned substantially in the lower zone center 59 of module 55. The thermostatic regulator and control valve 50A is set to maintain a constant temperature at sensor 50, typically 190° F.

The product rides on belt 15 through the upper region 60 in the saturated steam atmosphere, supplied by manifold discharge nozzles 36. Note the level 65 of the inlet and outlet ports for the conveyor belt, open to the atmosphere to keep the pressure within the cooking chambers substantially at the desired and critical atmospheric pressure level. Also it is critical that air is heavier than the hot steam and thus does not tend to rise for conveyance into the higher level cooking chamber, except for the trivial amount that is carried by friction with the conveyor belt and product upwards into the very much lighter saturated steam atmosphere to rapidly descend by force of gravity and keep the substantially pure saturated steam in the cooking region. Prior art systems have generally not so effectively controlled and eliminated undesirable air, vapor, and contaminant flow paths within a steam cooker, and thus could not provide the cooking efficiency and quality control with simplified control systems that this system symbiotically produces.

Figure 6:
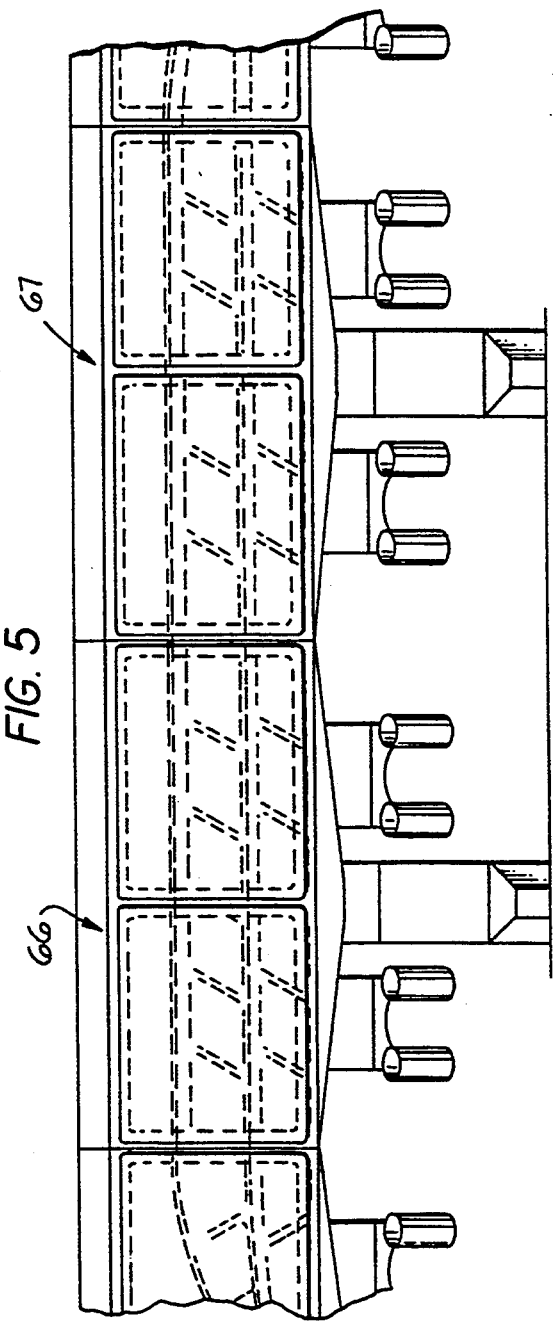
FIG. 6 is a side view sketch of a further modularized high capacity industrial cooking conveyor embodiment for higher volume and cooking speed capacity.

As seen from FIG. 6, two series modular cooking sections 66, 67 are provided along the conveyor belt, each having similar temperature controls as shown in FIG. 5. Thus, the product is cooler in section 66 than in section 67, and the saturated steam released in each compartment is substantially only that necessary to replenish cooking energy needed from the saturated steam. With the two cooking sections 66, 67, the range of throughput quantity of cooked product per unit time, for example, is increased for industrial cooking purposes. Thus, a longer dwell time is available with the longer belt travel distance through saturated steam, which provides more cooking energy so that the belt speed may be increased for more product throughput. One of the modules could be replaced or supplemented by a washing or browning module if desired.

Figure 7:
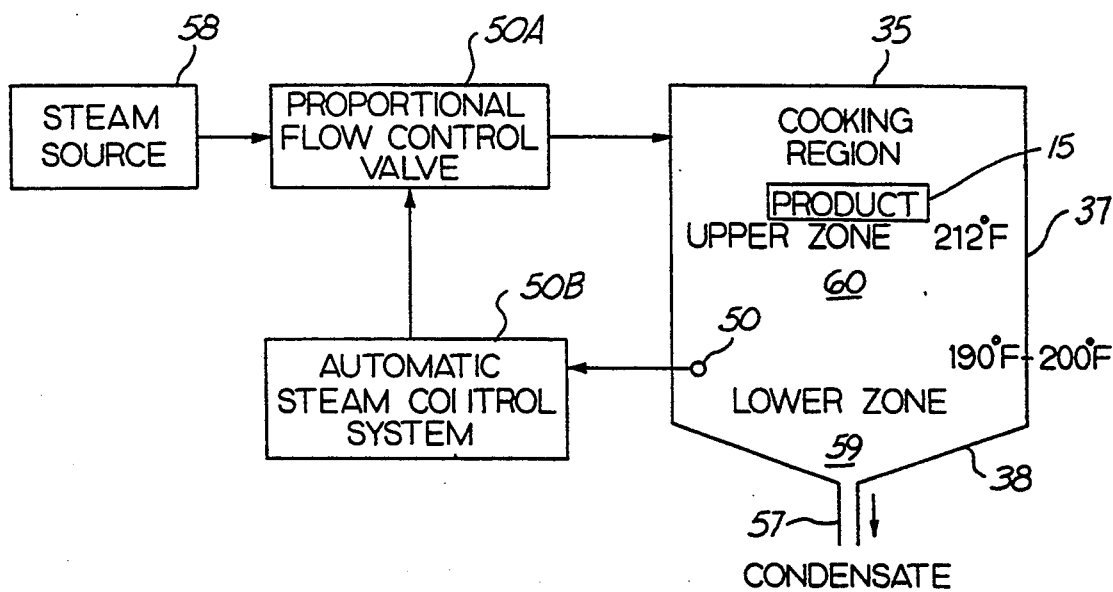
FIG. 7 is a system block diagram illustrating cooker and control system features afforded by this invention.

In FIG. 7, the relationship of the steam input control system to the cooking region structure afforded by this invention is set out in block diagram format. Incoming steam from steam source 58 is proportionately controlled by valve 50A to decrease or increase and keep the 190°-200° F. temperature at thermostat sensor 50 in the lower cooking region zone stable, by means of the automatic control system 50B that adjusts valve 50A in response to sensed temperature at sensor 50. This maintains the saturated steam atmosphere in the upper zone 60 of the cooking region and about the product on conveyor belt 15, and permits the condensate to drop toward outlet channel 57 substantially solely by force of gravity since only substantially that steam is being replaced that is condensed in cooking the product. Thus, this system corrects the significant deficiency of prior art devices that force hot steam into and out of a cooking chamber and lose energy that should have gone into cooking the product.

Figure 9:
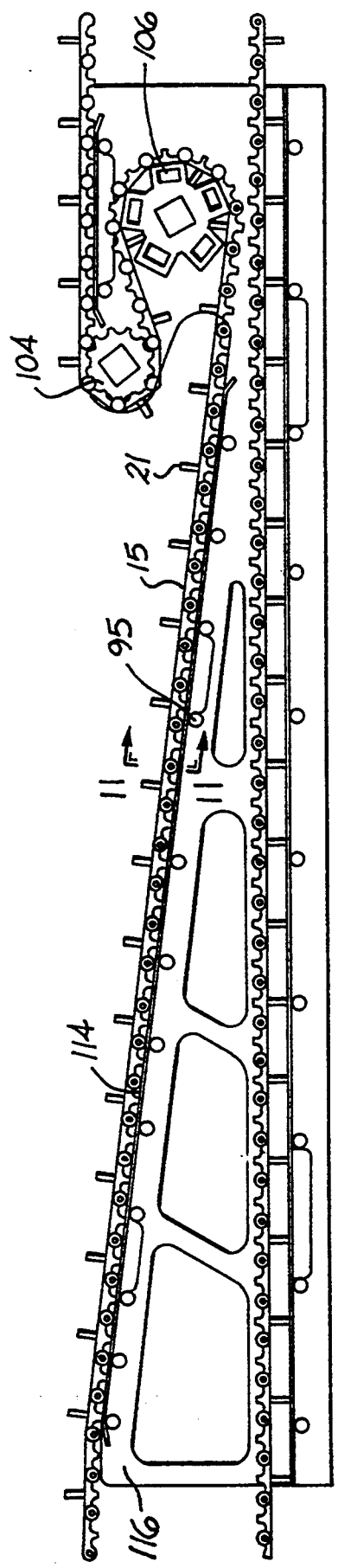
FIG. 9 is a fragmental side view of the product-repositioning conveyor of FIG. 8 without product shown.
Figure 10:
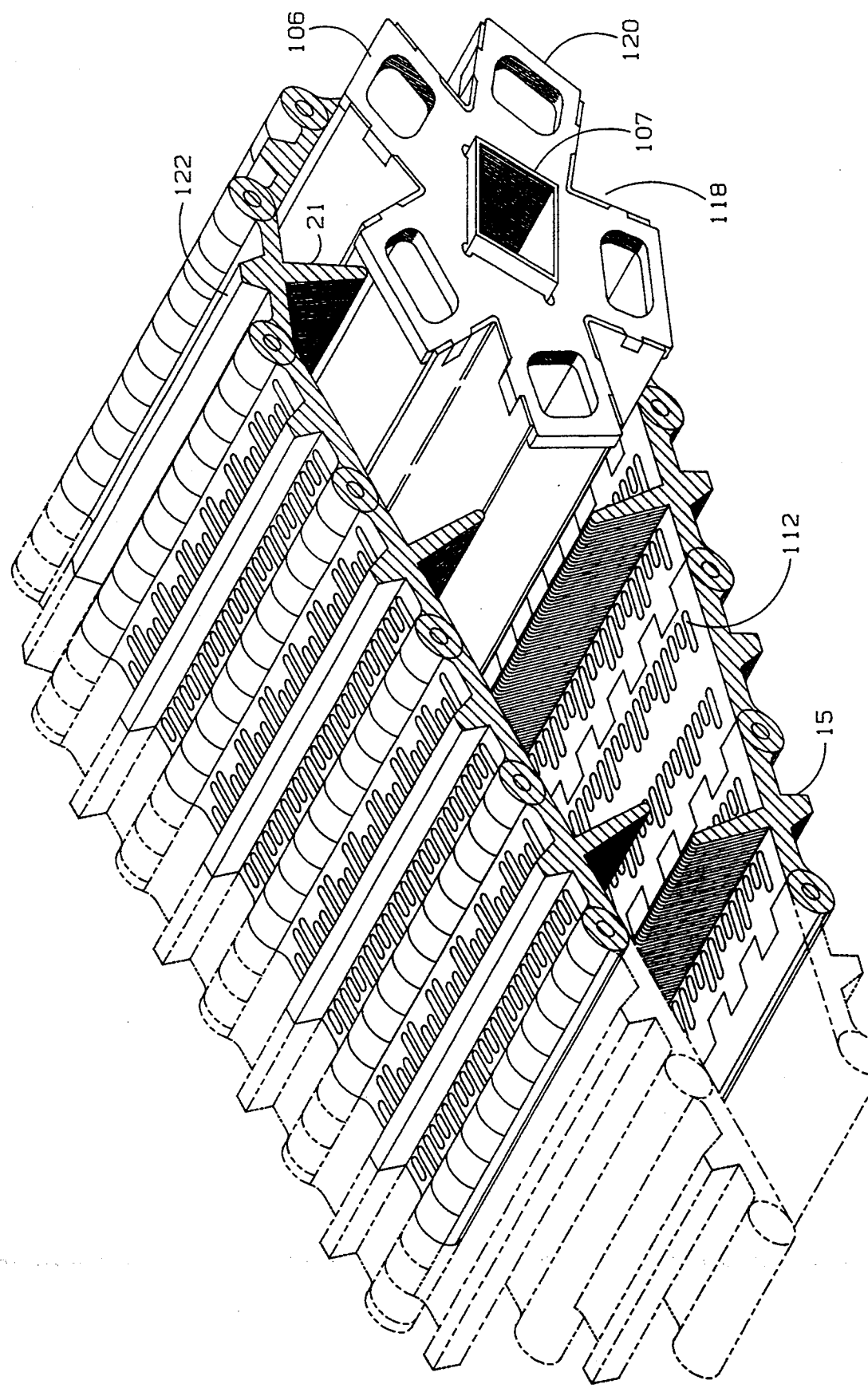
FIG. 10 is a fragmental perspective view of part of the product-repositioning conveyor of FIG. 8 illustrating the engagement of belt flights with the roller.
Figure 11:
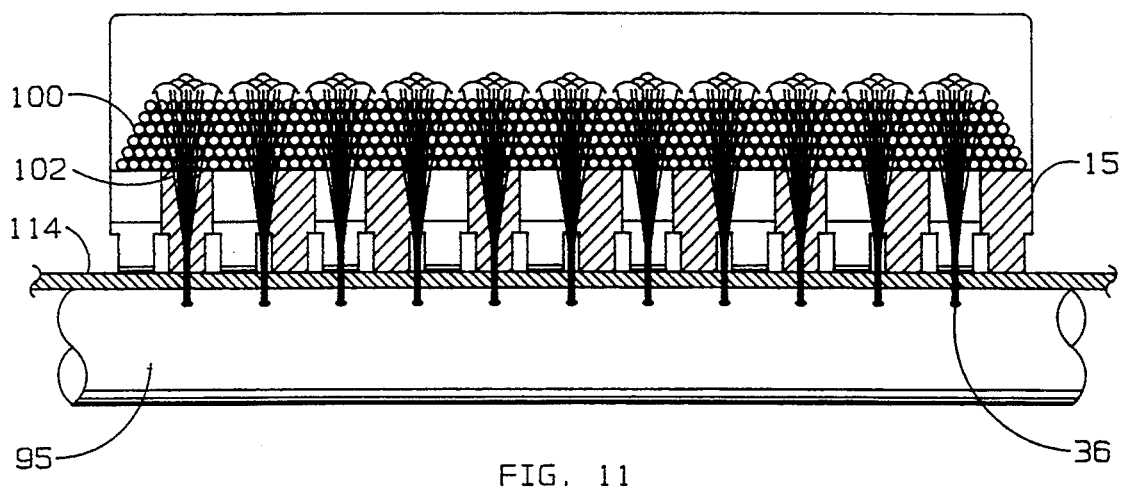
FIG. 11 is a partial cross-sectional end view of the conveyor system of the cooker of FIG. 9 taken along line 11—11, illustrating the injection of steam into a mat of vegetables.

As shown in FIG. 11, the conveyor belt 15 laden with a thick mat of product 100 is supported just above upwardly oriented steam outlets 36 of a steam pipe 95 by a wearsheet 114 on a support frame 116 (see FIG. 9). The steam pipes 95 are oriented such that the outlets 36 are positioned as close to the passing belt 15 as possible. The thin wearsheet 114 has a largely open area. The steam outlets 36 emit steam directed through the open areas of the wearsheet 14 and the foraminous belt 16 at high speed into the product mat 100. A foraminous belt 15, such as that detailed in FIG. 10, having many perforations 112 therethrough, channels steam through to the product mat 100. The high-speed jets 102 of steam penetrate the product mat 100, cooking the innermost products in the mat. Better cooking uniformity is achieved by jetting steam at high speed fairly uniformly across the width of the conveyed product. Generally, a higher jet speed provides better results, but too high a jet speed can result in turbulent flow paths drawing unwanted air into the cooking region. A range of combinations of the exit speed of the steam from the outlets 36 and their proximity to the belt 15 may be selected. For example, positioning the outlets 36 within about 1 cm of the inner surface of the belt 15 and emitting steam at a speed of above about 20 m/s provides good results. Furthermore, the high-speed jet blows free any small debris or fats that might tend to clog the outlets 36. To achieve high jet speeds across the width of the belt 15 for a given steam source pressure, the steam outlets 36 should be small in diameter and many in number. The total area of all the openings 36 must be enough to provide the necessary amount of steam required to cook the product. As an alternative to individual small outlets 36, a long, narrow slit in the top of the steam pipe 95 would provide a uniform fan spray of steam across the width of the belt 15. Because the steam outlets 36 and the product mat 100 are both situated in the air-free saturated steam region, no air is entrained by the steam jets 102. Furthermore, the mat 100 dissipates the steam jet 102 to minimize turbulence in the cooking chamber that could otherwise draft unwanted air into the cooking region.

Figure 8:
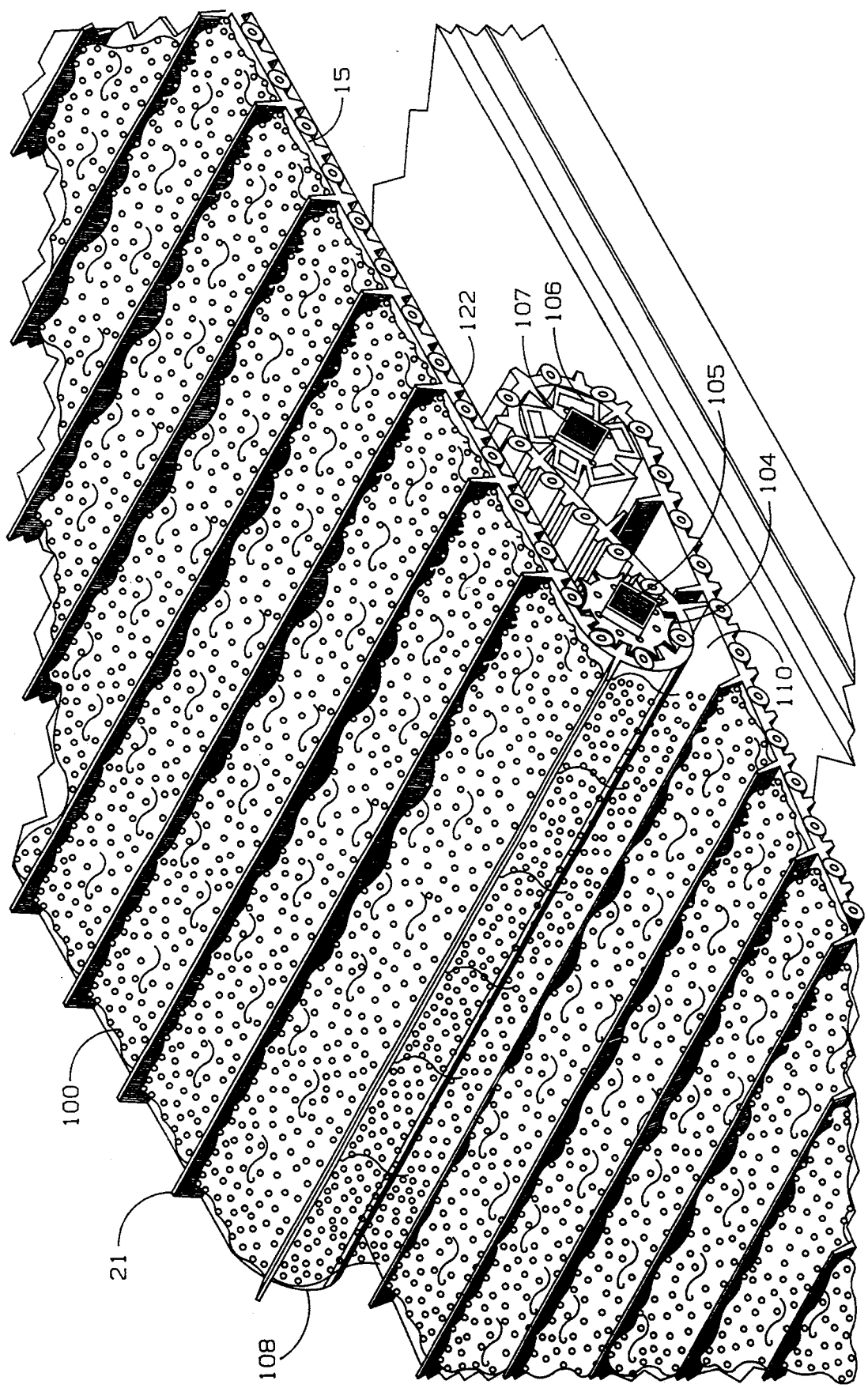
FIG. 8 is a fragmental perspective view of a portion of the conveyor of the cooker of the invention illustrating product repositioning.

Repositioning of product during cooking further ensures that each individual product item is sufficiently cooked. As shown in FIGS. 8-10, a product mat 100, in this case, peas, is conveyed along a conveyor belt 15. Flights 21 on the belt 15 help transport product along inclined portions of the carryway. An S-shaped back-flip portion is formed in the conveyor path by a forward, upper sprocket 104 mounted on a first shaft 105 and a rearward, lower roller 106 mounted on a second shaft 107. The shafts 105, 107 are rotatably supported at either end by conventional bearing assemblies (not shown) attached to the cooker frame. As the belt 15 articulates about the sprocket 104, product 100 drops off the belt entering the back-flip onto the belt 110 exiting the S-shaped back-flip portion of the conveying path. Product 100 is thereby repositioned on the conveyor 15 to improve cooking uniformity.

The back-flip roller 106 is in the form of a truncated star in cross-section. Deep, V-shaped troughs 118 between the flat, truncated points 120 of the roller 106 accommodate the flights 21 extending from the normally conveying side of the belt 15 as they articulate about the roller. In the version shown, the roller 106 is a five-pointed star engaging a conveyor belt 15 having flights 21 equally spaced two pitch lengths in the direction of belt travel along the length of the belt 15. (The pitch of a belt or chain is the distance between consecutive hinge axes in the direction of belt travel.)

The sprocket 104 at the entrance to the back-flip is actually a gang of individual sprocket wheels 104 spaced along the first shaft 105 and engaging the drive projections 122 extending from the non-conveying surface of the belt 15. The gang of sprockets 104 is preferably an idling sprocket, but could alternatively be driven by a motor (not shown) connected to the drive shaft 105. The driving force is provided by the motor 19 at the end of the cooker 17. As a further alternative, product repositioning could be accomplished by vertically overlapping the ends of one or more pairs of conveyor belts in the cooking chamber. Product falling off the end of the upper conveyor belt is repositioned upon landing on the lower belt.

It should therefore be evident that this invention has improved the state of the art and has unobviously changed cooking conditions in a longstanding art to provide a more efficient cooking method that can be consistently quality controlled with simple equipment than has heretofore been feasible. Accordingly those unique features and combinational reactions that signify the nature and spirit of this invention are defined with particularity in the following claims.

What is claimed as invention is:

1. A method for uniformly cooking thick layers of food product in an oxygen-free, saturated-steam environment, comprising the steps of:
    a) conveying, by means of a foraminous conveyor belt, a thick layer of food product continuously up into, through, and out of an upper region of a cooking chamber, the bottom of the upper region being at or above the levels of entrance and exit ports for the conveyor belt at each end of the cooking chamber;
    b) releasing jets of saturated steam formed by restricted openings in steam outlets, the jets of steam being directed upwardly through and substantially uniformly across the width of the foraminous conveyor belt as it traverses the upper region of the cooking chamber, the jets of steam being released from positions slightly below the conveyor belt on the carryway path and above the return path of the belt at a velocity sufficient to penetrate the thick layer of food product carried thereon; and
    c) controlling the rate of release of saturated steam to maintain an oxygen-free, saturated steam environment at substantially atmospheric pressure within the upper region of the cooking chamber by replenishing saturated steam lost through condensation.

2. The method of claim 1, further comprising the step of:
    d) repositioning the food product on the conveyor belt as it traverses the cooking chamber.

3. In a food cooking system in which a conveyor belt conveys food product into an open-ended cooking chamber having an upper side-walled cooking region of entrapped saturated steam, the pressure of which is maintained at substantially atmospheric and the temperature of which is maintained at about 212° F. by an energy supply means supplying uncontaminated saturated steam into the cooking region at a flow rate sufficient to provide cooking energy expended in cooking and to maintain a static, air-free, saturated steam environment at 212° F. in the cooking region, the improvement for uniformly cooking a thick layer of food product, characterized in that:
    the conveyor belt conveying the food product is an endless, foraminous belt conveying food product along a carryway path and returning along a lower return path; and
    the energy supply means includes steam outlets situated slightly below the conveyor belt on the carryway path through the cooking region and above the return path of the conveyor belt and distributed across the width of the conveyor belt, the steam outlets having restricted openings forming jets of steam, the openings directing the jets of steam through the foraminous belt at a velocity sufficient to penetrate the thick layer of food product carried thereon.

4. The improved food cooking system of claim 3, in which the energy supply means includes a network of steam pipes spaced from each other and spanning the width of the conveyor belt in the cooking region and positioned just below the carryway of the conveyor belt, each of the steam pipes including the steam outlets aligned along the pipe, the pipe being oriented with respect to the conveyor belt such that the steam outlets directs steam to the food product along the shortest path.

5. The improved food cooking system of claim 3, wherein the energy supply means supplies steam to the steam outlets at sufficient pressure and wherein the steam outlets are sufficiently restricted to emit streams of steam at exit speeds above about 20 meters per second.

6. The improved food cooking system of claim 3, wherein the steam outlets are situated within about 1 cm of the conveyor belt on the carryway path.

7. The improved food cooking system of claim 3, further comprising means for repositioning the food product on the conveyor belt as it traverses the cooking chamber.

8. The improved food cooking system of claim 7, wherein the means for repositioning the food product comprises:
    an upper, forward sprocket engaging the non-conveying side of the conveyor belt, the sprocket reversing the direction and orientation of the belt and offsetting the conveyor path as the belt articulates about the sprocket; and
    a lower, rearward roller engaging the conveying side of the conveyor belt, the roller reversing the direction and orientation of the belt and further offsetting the conveyor path as the belt articulates about the roller;
    thereby forming an S-shaped back-flip in the path of the conveyor belt causing product to drop off the upper portion of the belt articulating about the sprocket and land on the lower portion of the conveyor belt below the drop-off from the upper portion of the conveyor at the sprocket, whereby product is repositioned on the belt.

9. The improved food cooking system of claim 7, wherein the conveyor belt includes a plurality of flights extending outwardly from the conveying surface and transversely across the width of the belt and spaced longitudinally from each other along the belt in the direction of travel and wherein the means for repositioning the food product comprises a roller surface for accommodating the conveying side of the belt across its width, the roller surface comprising alternating peak and valley portions, the peak portions engaging the conveying side of the belt between consecutive flights, the valley portions being deep and wide enough to accommodate the flights as the belt articulates about the roller.

10. The improved food cooking system of claim 9, wherein the peak portions of the roller surface are flat and wherein the valleys are V-shaped.

11. A steam cooker for cooking a thick layer of food product, comprising:

a) an open-ended cooking chamber having an upper side-walled and covered cooking region above the level of the open ends of the cooking chamber;
b) a conveyor system, including an endless, foraminous conveyor belt, for transporting food product into, through, and out of the upper cooking region along a carryway path, the conveyor system further being arranged to return the conveyor belt along a lower return path; and
c) energy supply means for supplying saturated steam into the cooking region at a rate sufficient to replenish steam expended in cooking and to maintain a pure, saturated steam environment in the upper cooking region, the energy supply means including steam outlets situated proximately below the conveyor belt on the carryway path through the cooking region and above the return path of the conveyor belt and distributed across the width of the conveyor belt, the steam outlets having restricted openings forming jets of steam, the openings being oriented to direct the jets of steam through the foraminous belt at a velocity between a minimum velocity required to penetrate the thick layer of food product transported on the belt and a maximum velocity causing turbulence in the cooking region sufficient to draw contaminating vapors into the saturated steam environment in the cooking region.

12. The steam cooker of claim 11, in which the energy supply means includes a network of steam pipes spaced from each other and spanning the width of the conveyor belt in the cooking region and positioned just below the carryway of the conveyor belt, each of the steam pipes including the steam outlets arranged in a line along the pipe, the pipe being oriented with respect to the conveyor belt such that the line of steam outlets directs steam to the food product along the shortest path.

13. The steam cooker of claim 11, further comprising means for repositioning the food product on the conveyor belt as it traverses the cooking chamber.

14. The steam cooker of claim 13, wherein the means for repositioning the food product comprises:
   an upper, forward sprocket engaging the non-conveying side of the conveyor belt, the sprocket reversing the direction and orientation of the belt and offsetting the conveyor path as the belt articulates about the sprocket; and
   a lower, rearward roller engaging the conveying side of the conveyor belt, the roller reversing the direction and orientation of the belt and further offsetting the conveyor path as the belt articulates about the roller;
   thereby forming an S-shaped back-flip in the path of the conveyor belt causing product to drop off the upper portion of the belt articulating about the sprocket and land on the lower portion of the conveyor belt below the drop-off from the upper portion of the conveyor at the sprocket, whereby product is repositioned on the belt.

* * * * *